(12) United States Patent
Suzuki et al.

(10) Patent No.: US 8,715,798 B2
(45) Date of Patent: May 6, 2014

(54) RESIN COMPOSITION AND FOAM INSULATED WIRE

(75) Inventors: Hideyuki Suzuki, Hitachi (JP); Yuju Endo, Hitachi (JP); Sohei Kodama, Hitachi (JP); Masahiro Abe, Hitachi (JP); Akinari Nakayama, Hitachinaka (JP)

(73) Assignee: Hitachi Metals, Ltd., Tokyo (JP)

( * ) Notice: Subject to any disclaimer, the term of this patent is extended or adjusted under 35 U.S.C. 154(b) by 244 days.

(21) Appl. No.: 13/313,711

(22) Filed: Dec. 7, 2011

(65) Prior Publication Data
US 2012/0145433 A1 Jun. 14, 2012

(30) Foreign Application Priority Data

Dec. 8, 2010 (JP) ................................. 2010-274007

(51) Int. Cl.
*B29D 22/00* (2006.01)
*B29D 23/00* (2006.01)
*B32B 1/08* (2006.01)
*B65D 39/00* (2006.01)

(52) U.S. Cl.
USPC ................... 428/36.5; 428/500; 174/110 SR; 526/348; 526/352; 526/351; 525/240; 525/88

(58) Field of Classification Search
USPC ............ 428/36.5, 500; 174/110 SR; 526/348, 526/352, 351; 525/240, 88
See application file for complete search history.

(56) References Cited

U.S. PATENT DOCUMENTS

2009/0151970 A1 6/2009 Abe et al.

FOREIGN PATENT DOCUMENTS

| JP | 2000-235814 | 8/2000 |
| JP | 2001-135145 | 5/2001 |
| JP | 2006-022276 | 1/2006 |
| JP | 2006-249219 | 9/2006 |
| JP | 2006-339099 A | 12/2006 |
| JP | 2012-121990 | 6/2012 |

OTHER PUBLICATIONS

Counterpart JP Application 2010-274007 Office Action and English Translation of Notification of Reasons for Refusal mailed Oct. 1, 2013.

*Primary Examiner* — Michael C Miggins
(74) *Attorney, Agent, or Firm* — Roberts Mlotkowski Safran & Cole P.C.

(57) ABSTRACT

A resin composition includes a polyolefin resin. A viscosity of the resin composition is within a range of not less than 500 Pa·s and not more than 2300 Pa·s under measurement conditions of a measurement temperature of 170° C. and a measurement frequency of 1 Hz. A strain hardening rate of the resin composition in uniaxial elongational viscosity measured under measurement conditions of a measurement temperature of 150° C. and a strain rate of $3.0\ s^{-1}$ is not less than 800%. A foam insulated wire includes a conductor, and a foam insulation of the resin composition extruded on an outer periphery of thereof. A diameter of the conductor is 3.5 to 18 mm, and an outer diameter of the foam insulation is not less than 8 mm.

8 Claims, 3 Drawing Sheets

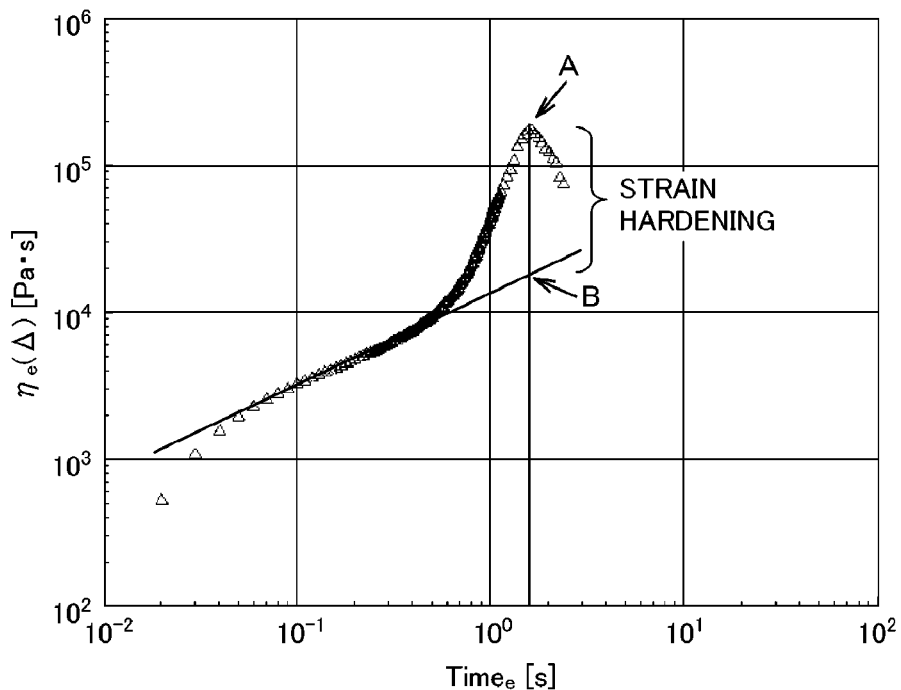

FIG.2

"STRAIN HARDENING" AND "STRAIN HARDENING RATE"
  "STRAIN HARDENING" MEANS AN INCREASE IN VISCOSITY OF MATERIAL WHEN
  LARGE STRAIN IS APPLIED THERETO IS INDICATED.
  • (A) IS A VISCOSITY PEAK IN MEASUREMENT.
  • (B) IS DEFINED AS A POINT OF INTERSECTION BETWEEN A PERPENDICULAR FROM (A)
    AND A LINE EXTENDED FROM A LINEAR PORTION AT INITIAL STAGE OF MEASUREMENT.
  • A DIFFERENCE IN PEAK POSITION BETWEEN (A) AND (B) IS "STRAIN HARDENING",
    AND (A)/(B) IS "STRAIN HARDENING RATE".
  • MEASUREMENT CONDITIONS
     APPARATUS: DYNAMIC VISCOELASTICITY MEASUREMENT APPARATUS
                WITH UNIAXIAL ELONGATIONAL VISCOSITY MEASURING JIG
                FROM TA INSTRUMENTS
     CONDITIONS: TEMPERATURE 150°C
                 STRAIN RATE 3.0 (s$^{-1}$)

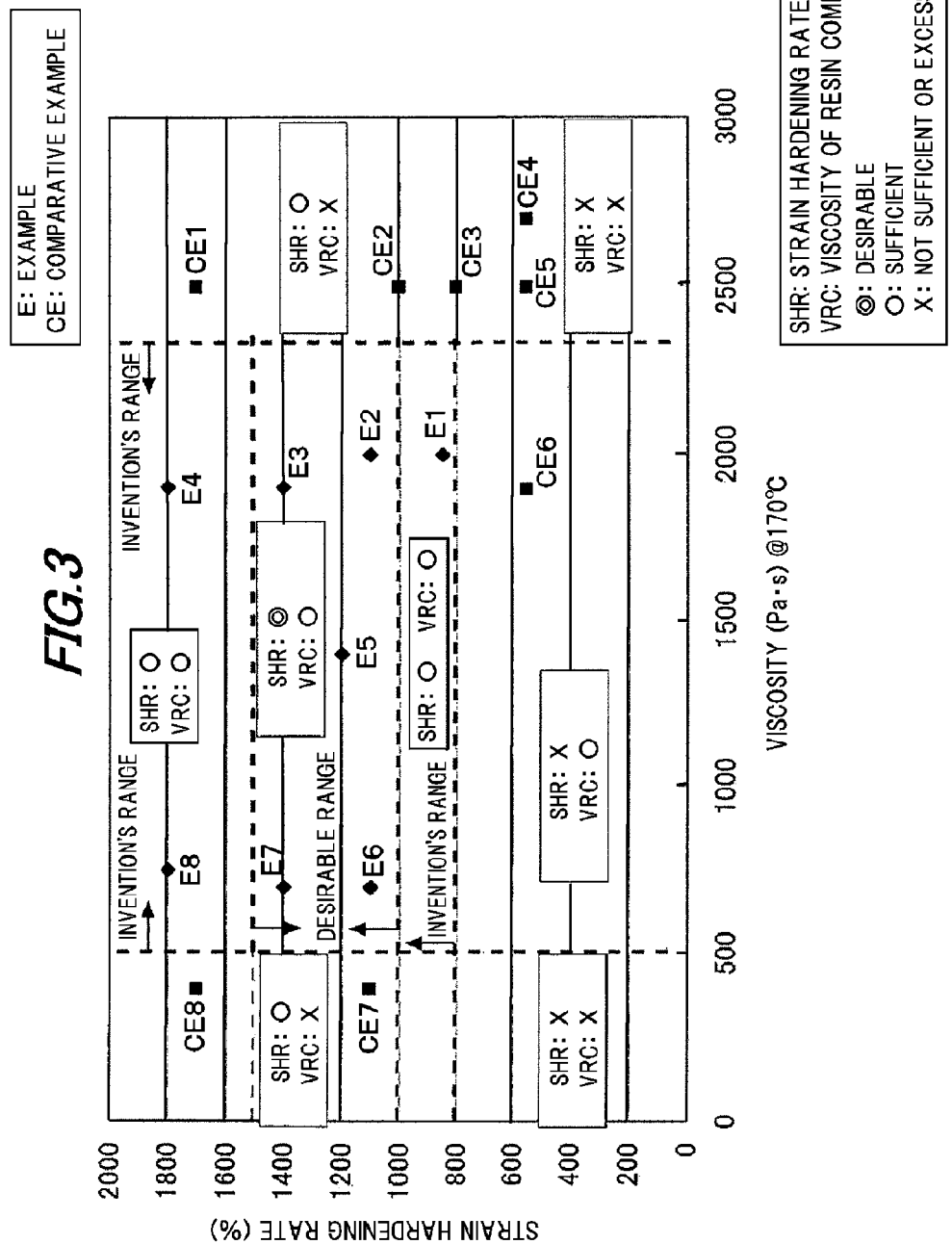

RESIN COMPOSITION AND FOAM INSULATED WIRE

The present application is based on Japanese Patent Application No. 2010-274007 filed on Dec. 8, 2010, the entire contents of which are incorporated herein by reference.

BACKGROUND OF THE INVENTION

1. Field of the Invention

The invention relates to a resin composition for being extruded on an outer periphery of a conductor so as to form a foam insulation, and a foam insulated wire using the same.

2. Related Art

In recent years, portable communication devices as typified by a cellular phone have been remarkably developed, and devices/components used for telecommunication thereof, such as antenna, wire or cable, are strongly required to have high performance.

Wires/cables used for an antenna of a communication device is required to reduce mainly transmission loss. Factors greatly affecting on the transmission loss are mainly a thickness of a wire/cable (conductor) and electrical characteristics of an insulator. If it is possible to reduce the transmission loss by improving these factors, a thinner conductor can be used while the transmission loss is still the same, and it is possible to achieve significant resource-saving and cost reduction.

Among the electrical characteristics of the insulator, factors affecting on the transmission loss are dielectric loss tangent and permittivity, which are reduced by foaming polyethylene in a currently popular method.

As a method of manufacturing a foam insulated wire, there are roughly two types of manufacturing methods as below.

Physical Foaming Method

One of the methods is to inject high pressure gas into resin melted in an extruder, which is called a physical foaming method. Here is an outline of the procedure.

(1) Resin is introduced into an extruder and is melted by kneading under heat.
(2) High pressure gas is injected at the middle of resin flow path so as to be dissolved in the resin.
(3) A conductor is coated with the resin having the gas dissolved therein.
(4) The resin applied is moved outside the extruder in accordance with the movement of the conductor.
(5) Pressure inside the extruder is released to make air-bubbles from the gas dissolved in the resin.
(6) The resin is cooled and solidified before excessive growth of the air-bubbles which causes non-uniformity in an insulator.

Chemical Foaming Method

Another method is to introduce a chemical foaming agent together with a resin, which is called a chemical foaming method. Here is an outline of the procedure.

(1) Resin and a foaming agent are introduced into an extruder. The foaming agent may be kneaded alone or with the resin.
(2) It is heated in the extruder to a decomposition temperature of the foaming agent or more. At this time, gas generated is dissolved in the resin while the high pressure state of the resin is maintained so that foaming does not occur in the extruder.
(3) A conductor is coated with the resin having the gas dissolved therein.
(4) The resin applied is moved outside the extruder in accordance with the movement of the conductor.
(5) Pressure inside the extruder is released to make air-bubbles from the gas dissolved in the resin.
(6) The resin is cooled and solidified before excessive growth of the air-bubbles which causes non-uniformity in an insulator.

In comparison to the chemical foaming method, the physical foaming method has following advantages.

(1) High foaming rate is easily obtained.
(2) Since a chemical foaming agent is not used, deterioration in electrical characteristics (permittivity or dielectric loss tangent) of an insulator caused by the foaming agent or a residue thereof less occurs.

That is why the physical foaming method is often used for manufacturing a high-performance foam insulated wire.

SUMMARY OF THE INVENTION

However, a foam insulated wire formed by the physical foaming method has a problem in that bubble growth is unstable. It is known that, since gas pressure in the air-bubble promotes the bubble growth, the bubble growth is slow when viscosity of surrounding material is high and it is fast when zero shear viscosity is low. Too fast bubble growth causes unevenness in the growth of air-bubbles or makes abnormal growth likely to occur, which causes outside diameter variation, eccentricity (uneven thickness), foaming rate variation and generation of blowholes.

There is a problem in that such variation leads to variation in dielectric loss tangent or permittivity of an insulator, which causes local impedance variation in a communication cable, resulting in a decrease in a S/N ratio, etc., due to a reflected wave. The followings are calculating formulas of permittivity, characteristic impedance and foaming rate. As described above, it is understood that characteristic impedance varies when a foaming rate or an outer diameter varies.

$$\text{Permittivity } \varepsilon = \frac{C \cdot \log_{10}(b/a)}{24.13} \quad \text{Formula 1}$$

$$\text{Characteristic impedance: } Z_s = \frac{60}{\sqrt{\varepsilon_s}} \times \ln\frac{b}{a}$$

$$\text{Foaming rate: } F = \frac{\varepsilon_p - \varepsilon_s}{1 - \varepsilon_s} \times 100(\%)$$

where C is capacitance (F/m), b is an outer diameter of insulator, a is a conductor diameter, $\varepsilon_p$ is relative permittivity before foaming a resin composition and $\varepsilon_s$ is relative permittivity after foaming the resin composition.

On the other hand, a large amount of gas is required to realize high foaming. Since significant foaming rate variation or outer diameter variation occurs when air-bubbles are generated in the extruder, it is necessary to maintain high resin pressure up to the exit of the extruder and to keep a state in which the gas is dissolved in the resin. Therefore, when the highly-foamed insulator (molten resin including gas) is extruded, the resin pressure is increased and a pressure difference before and after extrusion becomes large, hence, the bubble growth tends to rapidly proceed.

It is known that an increase in resin pressure at the time of extrusion also occurs when a high viscosity material is used. When a highly-foamed insulator is formed, use of a high viscosity resin to reduce the bubble growth leads to the increase in the amount of gas or the resin pressure, which eventually arises a problem of increasing variation in the outer diameter or the foaming rate, such as abnormal growth or separation of resin from a conductor in accordance with rapid bubble growth.

As a countermeasure against this problem, a method of using an extremely atomized foaming agent (JP-A-2006-339099), etc., has been proposed. This is to generate a large amount of air-bubbles by using a fine-particle nucleating agent to be an origin of foaming to reduce gas flowing into individual air-bubbles, thereby preventing abnormal growth of the air-bubbles. However, this method is not different in principle since the large amount of gas is injected at high pressure, and the problems described above are not completely solved.

Accordingly, it is an object of the invention to provide a resin composition excellent in foaming rate stability for preventing deterioration in a S/N ratio caused by impedance mismatch due to variation in foaming rate when being highly foamed, and a foam insulated wire using the resin composition.

(1) According to one embodiment of the invention, a resin composition comprises:
  a polyolefin resin,
  wherein a viscosity of the resin composition is within a range of not less than 500 Pa·s and not more than 2300 Pa·s under measurement conditions of a measurement temperature of 170° C. and a measurement frequency of 1 Hz, and
  wherein a strain hardening rate of the resin composition in uniaxial elongational viscosity measured under measurement conditions of a measurement temperature of 150° C. and a strain rate of 3.0 s$^{-1}$ is not less than 800%.

In the above embodiment (1) of the invention, the following modifications and changes can be made.
  (i) The polyolefin resin comprises polyethylene or polypropylene, or a mixture thereof.
  (ii) The polypropylene included as a portion or an entirety of the resin composition comprises any one or a mixture of a homopolymer as a single polymer, a random copolymer and a block copolymer as a copolymer.
  (iii) The polyethylene included as a portion or an entirety of the resin composition comprises any one or a mixture of high-density polyethylene (HDPE), medium-density polyethylene (MDPE), low-density polyethylene (LDPE) and linear low-density polyethylene (LLDPE).

(2) According to another embodiment of the invention, a foam insulated wire comprises:
  a conductor; and
  a foam insulation extruded on an outer periphery of thereof,
  wherein a diameter of the conductor is 3.5 to 18 mm, and an outer diameter of the foam insulation is not less than 8 mm,
  wherein a viscosity of a resin composition forming the foam insulation is within a range of not less than 500 Pa·s and not more than 2300 Pa·s under measurement conditions of a measurement temperature of 170° C. and a measurement frequency of 1 Hz, and
  wherein a strain hardening rate of the resin composition in uniaxial elongational viscosity measured under measurement conditions of a measurement temperature of 150° C. and a strain rate of 3.0 s$^{-1}$ is not less than 800%.

In the above embodiment (2) of the invention, the following modifications and changes can be made.
  (iv) A polyolefin included in the foam insulation comprises polyethylene or polypropylene, or a mixture thereof.
  (v) The polypropylene included as a portion or an entirety of the foam insulation comprises any one or a mixture of a homopolymer as a single polymer, a random copolymer and a block copolymer as a copolymer.
  (vi) The polyethylene included as a portion or an entirety of the foam insulation comprises any one or a mixture of high-density polyethylene (HDPE), medium-density polyethylene (MDPE), low-density polyethylene (LDPE) and linear low-density polyethylene (LLDPE).

Effects of the Invention

According to one embodiment of the invention, a resin composition can be provided that is excellent in foaming rate stability for preventing deterioration in a S/N ratio caused by impedance mismatch due to variation in foaming rate when being highly foamed, and a foam insulated wire using the resin composition.

BRIEF DESCRIPTION OF THE DRAWINGS

Next, the present invention will be explained in more detail in conjunction with appended drawings, wherein:

FIG. 2 is an explanatory diagram illustrating "strain hardening" and "strain hardening rate" of a resin composition used in the invention; and FIG. 3 is a diagram illustrating a relation between viscosity and a strain hardening rate of the resin composition in Examples and Comparative Examples of the invention.

DESCRIPTION OF THE PREFERRED EMBODIMENTS

Figure 1:
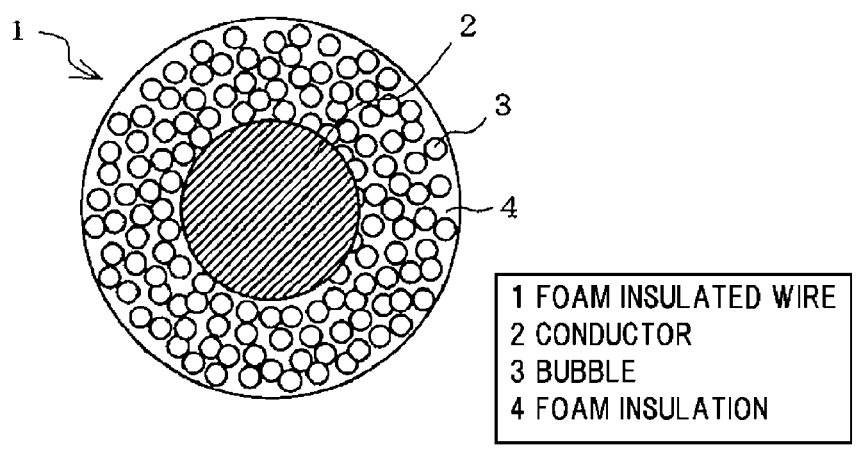
FIG. 1 is a horizontal cross sectional view showing a foam insulated wire in an embodiment of the present invention.

An embodiment of the invention will be described below in conjunction with the appended drawings.

Firstly, a foam insulated wire in which a resin composition of the present embodiment is used for a foam insulation will be described.

FIG. 1 is a horizontal cross sectional view showing a foam insulated wire in the present embodiment.

As shown in FIG. 1, a foam insulated wire 1 is composed of a conductor 2 and a foam insulation 4 covering an outer periphery of the conductor 2.

Copper is used for the conductor 2. A diameter of the conductor 2 is 3.5 to 18 mm The conductor 2 may be either a solid wire or a stranded wire. It should be noted that, since a stranded wire has a smaller conductor cross-sectional area than that of a solid wire, a solid wire diameter calculated from the same cross-sectional area is read as the stranded wire diameter.

The physical or chemical foaming method is used to form the foam insulation 4, in which a resin composition is extruded on the conductor 2 to coat the outer periphery thereof and is then foamed, thereby forming a foam insulation. The outer diameter of the foam insulation 4 is not less than 8 mm In the foam insulated wire 1 having the conductor 2 with a diameter of 3.5 to 18 mm and the foam insulation 4 with an outer diameter of not less than 8 mm, the foam insulation 4 excellent in foaming rate stability is formed by limiting viscosity and a strain hardening rate of the resin composition used for the foam insulation 4 within a certain range, even though the foam insulation 4 is highly foamed, e.g., 75%.

Next, the resin composition of the present embodiment will be described.

The resin composition used for forming the foam insulation 4 has viscosity falling within a range of not less than 500 Pa·s and not more than 2300 Pa·s under measurement conditions of a temperature, measured by a rotational rheometer, of 170° C. and a measurement frequency of 1 Hz, and satisfies not less than 800% of a strain hardening rate in uniaxial elongational viscosity measured under measurement conditions of a measurement temperature of 150° C. and a strain rate of 3.0 s$^{-1}$.

Viscosity and a strain hardening rate of the resin composition used for the foam insulation and measurement conditions thereof will be described.

Viscosity of Resin Composition: Measurement Condition 1

High viscosity of the resin composition impedes the bubble growth. On the other hand, when the viscosity of the resin composition is too low, deformation or uneven thickness due to dripping is likely to occur after extrusion and before solidification. Therefore, the viscosity of the resin composition at a temperature of 170° C. and a frequency of 1 Hz desirably falls within a range of not less than 500 Pa·s and not more than 2300 Pa·s. It is possible to change the viscosity of the resin composition by adjusting an extrusion temperature as required.

The viscosity of the resin composition is measured by a dynamic viscosity measurement apparatus (e.g., a dynamic viscoelasticity measurement apparatus: ARES manufactured by TA instruments company) using parallel plates. The viscosity under the measurement conditions of a temperature of 170° C. and a frequency of 1 Hz is read. Table 1 shows the summary of the measurement conditions of the resin composition.

TABLE 1

| Viscosity measurement of Resin composition | |
|---|---|
| Items | Measurement conditions |
| Type of apparatus | Rotational rheometer |
| Measurement temperature (° C.) | 170 |
| Measuring jig | 20-mm diameter parallel plates |
| Thickness of sample | 1.0 mm |
| Measurement frequency | 1 Hz |

Strain Hardening Rate: Measurement Condition 2

"A strain hardening rate" is a rate of "strain hardening" which indicates an increase in viscosity when large strain is applied to the resin composition. As shown in FIG. 2, the point A is a viscosity peak at the time of uniaxial elongational viscosity measurement, and the point B is a point (viscosity) of intersection between a line extended from a straight line portion (linear portion) indicating the initial stage of measurement and a perpendicular line drawn from the point A to a horizontal axis (in FIG. 2, a vertical axis indicates viscosity and a horizontal axis indicates time). A difference in peak position between A and B is "strain hardening" and (A/B)×100(%) is "a strain hardening rate".

In the invention, it is desirable that the strain hardening rate be not less than 800%, and more preferably, not less than 1000%. On the other hand, the strain hardening rate is desirably not more than 1500% since viscosity at the time of stretching largely increases when using a resin composition with an extremely large strain hardening rate and the substantially high viscosity material is made by only small bubble growth, which rather impedes the bubble growth.

The strain hardening rate is measured by a dynamic viscosity measurement apparatus (e.g., a dynamic viscosity measurement apparatus: ARES manufactured by TA instruments company) with a uniaxial elongational viscosity measuring jig attached thereto under measurement conditions of a temperature of 150° C. and a strain rate of 3.0 s$^{-1}$. A sample used has a size of about 18×10×0.8 to 1.0 (t)mm It is desirable to cool the sample to a room temperature by taking at least 4 hours in order to reduce a hardening strain during a cooling process of press molding. Table 2 shows the summary of the measurement conditions of the strain hardening rate in uniaxial elongational viscosity.

TABLE 2

| Strain hardening rate* measurement in uniaxial elongational viscosity | |
|---|---|
| Items | Measurement conditions |
| Type of apparatus | Uniaxial elongational viscometer |
| Measurement temperature | 150° C. |
| Strain rate | 3.0 (s$^{-1}$) |

*See FIG. 2 for the strain hardening rate.

Concept of Viscoelasticity

The essential part of the invention is to use a resin composition of which viscosity falls within a range of not less than 500 Pa·s and not more than 2300 Pa·s and of which strain hardening rate is not less than 800%, i.e., a "low-viscosity and high strain hardening" resin composition. By using such a resin composition, following effects are obtained as compared to the case of foaming a conventional high viscosity material. That is;

(A) Since resistance at the time of bubble growth is small, it is possible to reduce gas pressure (amount) required for the bubble growth.

(B) Since the amount of gas is small, it is possible to reduce resin pressure to keep the dissolved gas in the resin composition at the time of extrusion.

(C) Therefore, a difference in resin pressure before and after extrusion is small and gas generation from the resin composition is also moderate.

(D) Since the viscosity of the resin composition is low, the air-bubble can grow even though the gas generation is moderate.

(E) When the air-bubble grows to some extent, resistance against the bubble growth increases due to strain hardening.

(F) Since the amount of gas for the bubble growth is small and growth pressure is small, the air-bubble does not grow abnormally and the bubble growth is easily stopped by strain hardening.

(G) Therefore, problems such as abnormal growth or blowhole, etc., are less likely to occur even though it is highly foamed.

Such a "low-viscosity and high strain hardening" resin composition will be further described in detail.

Resin

The resin used for the resin composition of the invention is a polyolefin resin and typical examples include polypropylene and polyethylene, however, the type is not specifically defined.

As polypropylene, it is possible to use any one or a mixture of a homopolymer (single polymer), a random copolymer and a block copolymer.

As polyethylene, it is possible to use any one or a mixture of high-density polyethylene (HDPE), medium-density polyethylene (MDPE), low-density polyethylene (LDPE) and linear low-density polyethylene (LLDPE). Alternatively, it is possible to add very low density polyethylene (VLDPE) or ultrahigh molecular weight polyethylene (UHMWPE).

In this regard, a ratio of side chain to main chain in a molecule of resin needs to fall within a certain range in each case, and a physical property affected by the ratio is a strain hardening rate. In a structure with a high ratio of side chain to main chain, such as LDPE, since elongational viscosity is already high from the initial stage of stretching under the influence of entanglement, the position of the point B in FIG. 2 becomes higher and it is thereby difficult to have a large strain hardening rate.

On the other hand, in HDPE having an extremely small amount of side chains, the point A is low because the side chains are less entangled and the strain hardening itself is less likely to occur, which results in that the strain hardening rate is also small. Therefore, a balance between the main chain and the side chain is important for a material allowing high foaming, and it was found that the strain hardening rate in the uniaxial elongational viscosity of the resin composition should be not less than 800% in order to obtain a satisfactory balance.

As described above, the satisfactory value of the strain hardening rate is not obtained by either too many (an excessively large amount of) or too few (an excessively small amount of) side chains.

A ratio of the side chain to the main chain for obtaining an adequate strain hardening rate is difficult to be expressed by a simple index since it varies due to a balance with an average molecular weight, molecular weight distribution, a melt flow rate and other physical properties of the material. On the other hand, in a resin allowing the type (size) or an amount of side chain to be controlled, such as LLDPE, a large strain hardening rate is easily obtained since the entanglement of the side chains can be also controlled to some extent.

Here, the possible easiest way is to use LLDPE as a main material, and when a desired physical property is not obtained by a single body thereof, it is possible to add LDPE or HDPE.

In a specific example of FIG. 2, LLDPE which has more side chains than HDPE is used as a base resin, to which HDPE is added to lower the point B by suppressing the linear portion of the strain hardening, or to which LDPE is added to raise the point B by increasing the linear portion.

Foaming Method and Conditions

A forming method will be described. There are two forming methods, physical foaming and chemical foaming. The physical foaming method is preferable for the present invention, however, it is possible to select the chemical foaming method depending on the purpose and required performance of the product.

Foam-Nucleating Agent MB

In case of using the physical foaming method, it is possible to use a foam-nucleating agent as an origin where the gas dissolved in the resin composition is generated as air-bubbles. The foam-nucleating agent is fine powder in most cases, which is likely to cause dispersion failure in the resin composition when being introduced into the extruder. Therefore, a method of preliminarily adding masterbatch (MB) which is a compound with a high concentration of foam-nucleating agent blended thereto is generally used.

Specific nature and form are not specifically required for the foam-nucleating agent since the purpose is to disperse the highly-concentrated foam-nucleating agent. Alternatively, in order to further improve dispersibility in the extruder, it is possible to preliminarily dilute and knead with HDPE or LDPE or a portion or the entire LLDPE, which are used in the invention.

The type of the foam-nucleating agent is not specifically defined even though various alternatives may be available depending on materials such as an organic matter or an inorganic matter or size and shape, and it is possible to select depending on the purpose and effect thereof.

Examples of an organic matter include azo compounds typified by ADCA (azodicarbonamide), nitroso compounds typified by N,N'-dinitrosopentamethylenetetramine, and hydrazine derivatives typified by OBSH (4,4'-oxybis(benzenesulfonyl hydrazide)) or HDCA (hydrazodicarbonamide), etc. Although these have a function as a below-described foaming agent, it does not limit usage as a foam-nucleating agent. Alternatively, it is possible to select powder of polyester, polyimide, fluorine resin, polymethylpentene, cyclic olefin copolymer, polystyrene, styrene copolymer, polylactic acid, polyamide-imide, polyetherimide, polyether ketone and other various resins.

In addition, it is possible to select a method in which a resin different from a base resin is added as a foam-nucleating agent and is kneaded and stirred in an extruder to exert an effect as a foam-nucleating agent.

Silica, talc and other metal compounds can be selected as an inorganic matter.

It is obvious that a foam-nucleating agent is generally added, however, it is possible to select a method without addition of the foam-nucleating agent depending on the intended use and purpose of the foam insulated wire 1.

Foaming Agent MB

On the other hand, in case of the chemical foaming, a foaming agent as a blowing gas source needs to be mixed and kneaded in the resin. Masterbatch of the foaming agent is also generally formed in the same manner as the foam-nucleating agent MB, however, it is alternatively possible to introduce a single body of the foaming agent into the extruder or to preliminarily dilute and knead.

As a foaming agent, it is possible to use azo compounds typified by ADCA (azodicarbonamide), nitroso compounds typified by N,N'-dinitrosopentamethylenetetramine, hydrazine derivatives typified by OBSH (4,4'-oxybis(benzenesulfonyl hydrazide) or HDCA (hydrazodicarbonamide) or sodium hydrogen carbonate, etc., depending on the intended use and purpose.

Additive Agent Etc.

Considering the intended purpose of the foam insulated wire 1, it is preferable to use only a pure polyolefin resin for the resin composition as long as the electric characteristics thereof allow, however, inevitable use of an additive agent for maintaining other characteristics or for manufacturing is possible.

Example of the former include antioxidant, dispersion aid for dispersing a foam-nucleating agent and colorant for identifying multiple foam insulated wires 1, etc., and examples of the latter include molecular weight control at the time of resin synthesis (devitalizing agent for preventing excess polymerization) and residual catalyst. These can be used depending on the purpose and effect thereof.

The foam insulation 4 having many air-bubbles 3 is formed by extrusion-coating the outer periphery of the conductor 2 with the resin composition formed under the above conditions, thereby obtaining the foam insulated wire 1.

The foam insulated wire 1 obtained as described above has the foam insulation 4 with small variations in outer diameter as well as in foaming and with less generation of blowholes even though it is highly foamed, hence, a high-performance foam insulated wire with low loss and small impedance variation. Therefore, the problem in the conventional technique, which is deterioration in a S/N ratio caused by impedance mismatch in accordance with the foaming rate variation in the foam insulation when being highly foamed, is prevented.

It is possible to use the foam insulated wire as, e.g., a cable for communications aerial. In this case, an external conductor is provided on an outer periphery of the foam insulation and the outer side thereof is further coated with an insulator.

For the intended use other than for a communication cable, plural wires may be twisted together or the wires may be arranged to have a parallel pair (twin-ax) construction, etc., if necessary. Alternatively, it is possible to provide a shield layer or a sheath layer, and a combination of plural shield and sheath layers is also possible.

Although the foam insulated wire 1 having the foam insulation 4 formed on the outer periphery of the conductor 2 has been described in the present embodiment, the foam insulated wire may have a structure in which the outer layer of the foam insulation is coated with a separately prepared resin containing a colorant (pigment, dye, etc.) blended therein.

Alternatively, it is possible to provide a non-foamed inner layer directly on the conductor (outer periphery) followed by further coating of a foam insulation on the outer periphery thereof, besides the outer coating formed of the resin with a colorant blended therein. This is effective, especially when using a stranded wire, to prevent an outgassing phenomenon occurring along an interstice between strands. Alternatively, as a modification thereof, a method of slightly foaming the inner layer may be used in order to improve the foaming rate as much as possible.

Various modifications of the conductor 2 may be possible. In case of a thick conductor, it may be formed as a pipe-shaped conductor since it is very heavy and rigid. At this time, the shape of the pipe can be varied into a wave shape, a spiral shape or other shapes in order to further impart flexibility.

In addition, the conductor 2 is not limited to copper, and it is possible to use other metals or alloys. Also, a linear object of ceramics or organic material with conductivity can be used as long as it is possible to ensure sufficient conductivity.

Furthermore, it is possible to select whether or not providing plating, or to select the type thereof from gold, silver tin or other plating depending on the purpose and intended use thereof. As a surface modification method other than plating, it is possible to select use of coating, sintering or a cladding material, etc.

Examples and Comparative Examples of the invention will be described.

Table 3 shows the list of test materials used in Examples and Comparative Examples. Table 4 shows compositions of respective materials and viscosity as well as strain hardening rates of resin compositions formed of the materials.

TABLE 3

List of materials under test

| Type | Manufacturer | Name | Density* | MFR** |
|------|--------------|------|----------|-------|
| HDPE | Prime Polymer | Hizex5305E | 0.951 | 0.8 |
|      | Ube-Maruzen | UBE 2070 | 0.953 | 8.0 |
|      | Dow | 6944 | 0.965 | 8.0 |
| LDPE | Ube-Maruzen | B028 | 0.927 | 0.5 |
|      | Ube-Maruzen | B228 | 0.928 | 2.0 |
| LLDPE | Sumitomo Chemical | L5721 | 0.937 | 8.0 |
|       | Ube-Maruzen | 2525F | 0.926 | 2.5 |
|       | Prime Polymer | 15150J | 0.914 | 15.0 |

*Density (g/cm$^3$)
**MFR (g/10 min) in conformity with JIS-K6922-2

TABLE 4

Material composition, viscosity and strain hardening rate

| | | Examples | | | | | | | |
|---|---|---|---|---|---|---|---|---|---|
| Type | Name | E1 | E2 | E3 | E4 | E5 | E6 | E7 | E8 |
| HDPE | Hizex5305E | — | 20 | — | — | — | — | — | — |
|      | UBE 2070 | — | — | — | — | — | 95 | — | 75 |
|      | 6944 | 55 | 40 | 30 | 45 | 45 | — | 70 | — |
| LDPE | B028 | 25 | — | — | 40 | — | — | — | 10 |
|      | B228 | — | 15 | 30 | — | 20 | — | — | — |
| LLDPE | L5721 | 20 | 20 | 20 | — | 30 | — | 25 | — |
|       | 2525F | — | — | 10 | — | — | — | — | — |
|       | 15150J | — | 5 | 10 | 15 | 5 | 5 | 5 | 15 |
| Viscosity of Resin composition (Pa · s, at 170° C. and 1 Hz) | | 2000 | 2000 | 1900 | 1900 | 1400 | 700 | 700 | 750 |
| Strain hardening rate (%, at 150° C. and 3 s$^{-1}$) | | 850 | 1100 | 1400 | 1800 | 1200 | 1100 | 1400 | 1800 |

| | | Comparative Examples | | | | | | | |
|---|---|---|---|---|---|---|---|---|---|
| Type | Name | CE1 | CE2 | CE3 | CE4 | CE5 | CE6 | CE7 | CE8 |
| HDPE | Hizex5305E | — | 30 | — | — | — | — | — | — |
|      | UBE 2070 | — | — | — | 55 | — | 65 | 90 | — |
|      | 6944 | 35 | 30 | 65 | — | — | — | — | 50 |
| LDPE | B028 | 50 | — | 35 | 20 | — | — | — | — |
|      | B228 | — | 15 | — | — | — | — | — | — |
| LLDPE | L5721 | — | 20 | — | — | 50 | — | — | 40 |
|       | 2525F | — | — | — | 25 | 50 | 35 | — | — |
|       | 15150J | 15 | 5 | — | — | — | — | 10 | 10 |
| Viscosity of Resin composition (Pa · s, at 170° C. and 1 Hz) | | 2500 | 2500 | 2500 | 2700 | 2500 | 1900 | 400 | 400 |
| Strain hardening rate (%, at 150° C. and 3 s$^{-1}$) | | 1700 | 1000 | 800 | 550 | 550 | 550 | 1100 | 1700 |

FIG. 3 shows a relation between viscosity and a strain hardening rate of the resin compositions compounded as shown in Table 4. Since the present invention is characterized in that a resin composition having viscosity of not less than 500 Pa·s and not more than 2300 Pa·s and a strain hardening rate of not less than 800%, desirably 1000 to 1500%, is extruded to coat a conductor and is foamed to be used as a foam insulation, materials were compounded so as to obtain viscosity and strain hardening rates which make comparison easy.

A material, in which 1 part by weight of ADCA (azodicarbonamide) as a foam-nucleating agent was added to 100 parts by weight of the compound shown in Table 4 and was then sufficiently kneaded using a twin-screw extruder, was used for a foam insulation of a foam insulated wire used in Examples, and a foam insulated wire was thereby experimentally manufactured. Table 5 shows test conditions.

TABLE 5

Conditions for trial production

| | Item | Unit | Trial product 1 | Trial product 2 | Trial product 3 |
|---|---|---|---|---|---|
| Conductor used | Shape | — | Pipe | Pipe | Pipe |
| | Diameter | mm | 3.9 | 9.0 | 17 |
| Target | Foaming rate | % | 75 | 75 | 75 |
| | Outer diameter | mm | 12 | 24 | 42 |
| Extruder | Bore diameter (φ) | mm | | 90 | |
| | L/D | — | | 39 | |
| | Extrusion temp. | ° C. | | 150 to 190 | |
| | Linear velocity | m/min | 55 | 30 | 10 |
| Gas | Type | — | | Nitrogen | |
| | Pressure | MPa | | 31 to 50 | |

Three types of copper pipes respectively having diameters of 3.9 mm (Trial product 1), 9.0 mm (Trial product 2) and 17 mm (Trial product 3) were used as a conductor. An outer diameter of a conductor is mentioned when a pipe-shaped conductor is used. A foam insulated wire was experimentally manufactured by foaming a foam insulation of each resin composition on the conductor with a foaming rate target of 75% for each case.

An extruder for physical foaming, which have a bore diameter of 90 mm and L/D of 39 (L: cylinder length of the extruder, D: cylinder bore diameter of the extruder) and injects nitrogen gas from the middle section, was used. A capacitance measuring instrument and an outer diameter measuring instrument are provided at the middle of the line, and temperature, linear velocity and gas pressure were adjusted so that a foaming rate, which was derived from the capacitance and the outer diameter, and the outer diameter are consistent with the respective targets. The extrusion temperature was 150 to 190° C., the linear velocity was 55 m/min in Trial product 1, 30 m/min in Trial product 2 and 10 m/min in Trial product 3, and the gas pressure was 31 to 50 MPa.

Samples of not less than 500 m were each made, an outer diameter and capacitance thereof were read from data of a sensor provided on the line of the extruder, and the foaming rate was calculated therefrom. Variations in outer diameter and foaming rate which cause impedance variation were evaluated.

Table 6 shows criteria of outer diameter variation and foaming rate variation of the experimentally manufactured foam insulated wire. In addition to ○(circle) and ×(cross) indicating pass and fail with respect to the criteria, ⊚(double circle) indicating particularly excellent is included to evaluate in three grades.

TABLE 6

| | | Criteria | | |
|---|---|---|---|---|
| Evaluation items | Symbol | Trial product 1 | Trial product 2 | Trial product 3 |
| Outer diameter variation (mm) | ⊚ | ± less than 0.1 | ± less than 0.2 | ± less than 0.3 |
| | ○ | ± less than 0.2 | ± less than 0.3 | ± less than 0.4 |
| | X | ± not less than 0.2 | ± not less than 0.3 | ± not less than 0.4 |
| Foaming rate variation (%) | ⊚ | | ± less than 2.0 | |
| | ○ | | ± less than 3.0 | |
| | X | | ± not less than 3.0 | |

Outer Diameter Variation

Since the diameter of the foam insulated wire is significantly different in Trial products 1 to 3, a criterion of the outer diameter variation is determined for each wire.

Foaming Rate Variation

As for the foaming rate, ±less than 2.0% of variation was evaluated as ⊚ (excellent) and ±less than 3.0% was evaluated as ○(pass).

In addition, the experimentally manufactured foam insulated wires were evaluated for generation of blowholes, and were then comprehensively evaluated by also taking into consideration the outer diameter variation as well as the foaming rate variation.

Generation of Blowholes

The experimentally manufactured foam insulated wire was cut in about every 50 m and each cross section thereof was observed by an electronic microscope. Then, pressure, frequency and size of blowhole in a foam insulation were compared. Ones having "a diameter about 5 times the surrounding air-bubbles" were recognized as blowholes. Evaluation including size of individual blowholes and frequency was classified into the 3 grades. The wire in which large blowholes were generated was evaluates as × (fail), the wire with the generation of blowholes but with no quality problem due to relatively small size of individual blowholes was evaluated as ○ (pass) and the wire in which blowholes were not substantially generated was evaluated as ⊚ (excellent).

Comprehensive Evaluation

Comprehensive evaluations are shown in three grades of ⊚, ○ and × as a combined result of each evaluation item with an addition of productivity.

Tables 7 to 9 show respective results of Trial products 1 to 3. Evaluations are indicated by ⊚, ○ and × based on Table 6 and the criteria mentioned above. It should be noted that the sequence numbers in Tables 7 to 9 indicate "Example number in Table 4)-(Trial product number)", such that Trial product 1 using a compounded material in Example 1 is "(Example) 1-1" and Trial product 3 using a compounded material in Example 5 is "(Example) 5-3". In the specification, "trial product number" shown in Tables 7 to 9 is omitted to avoid making the description complicated.

Table 7 shows results of Trial product 1 (conductor diameter of 3.9 mm, outer diameter of foam insulator of 12 mm and foaming rate of 75%).

TABLE 7

Results of Trial product 1 (conductor diameter: 3.9 mm, outer diameter of foam insulation: 12 mm, foaming rate: 75%)

| | Items | | Examples | | | | | | | | | Comparative Examples | | | | | | | |
|---|---|---|---|---|---|---|---|---|---|---|---|---|---|---|---|---|---|---|
| | | | 1-1 | 2-1 | 3-1 | 4-1 | 5-1 | 6-1 | 7-1 | 8-1 | 1-1 | 2-1 | 3-1 | 4-1 | 5-1 | 6-1 | 7-1 | 8-1 |
| Conditions | Viscosity of Resin composition | Pa·s | 2000 | 2000 | 1900 | 1900 | 1400 | 700 | 700 | 750 | 2500 | 2500 | 2500 | 2700 | 2500 | 1900 | 400 | 400 |
| | Strain hardening rate | % | 850 | 1100 | 1400 | 1800 | 1200 | 1100 | 1400 | 1800 | 1700 | 1000 | 800 | 550 | 550 | 550 | 1100 | 1700 |
| | Gas pressure | MPa | 37 | 37 | 38 | 40 | 35 | 32 | 33 | 37 | 42 | 41 | 41 | 42 | 41 | 36 | 31 | 33 |
| Evaluations | Outer diameter variation | | ⊚ | ⊚ | ⊚ | ○ | ⊚ | ⊚ | ⊚ | ○ | X | X | X | X | X | ○ | X | X |
| | Foaming rate variation | | ⊚ | ⊚ | ⊚ | ○ | ⊚ | ⊚ | ⊚ | ⊚ | X | X | ○ | X | X | ○ | ○ | ○ |
| | Generation of blowholes | | ○ | ⊚ | ⊚ | ⊚ | ⊚ | ⊚ | ⊚ | ⊚ | ⊚ | ○ | ○ | X | X | X | ○ | ⊚ |
| | Comprehensive evaluation | | ○ | ⊚ | ⊚ | ○ | ⊚ | ⊚ | ⊚ | ○ | X | X | X | X | X | X | X | X |

In Table 7, Examples 1 to 4 are evaluations of resin compositions having substantially the same viscosity and different strain hardening rates from each other. Generation of extremely fine blowholes which does not occur a practical problem was observed in Example 1 in which the strain hardening rate is small, and variations in outer diameter and foaming rate are slightly large in Example 4 in which the strain hardening rate is large in the other way around. This is because excess growth of air-bubbles cannot be suppressed in Example 1 due to small strain hardening and the air-bubbles turn into a state similar to blowholes. Conversely, the strain hardening rate is high in Example 4, actual viscosity of the resin composition is increased by slight strain (bubble growth), and the bubble growth is suppressed. Accordingly, it is necessary to increase the amount of gas in order to achieve the same foaming rate as other Examples, which results in rapid bubble growth and an increase in variations in outer diameter and foaming rate caused thereby.

In Examples 2, 5 and 6, the resin compositions have the strain hardening rates close to each other and different viscosity from each other. In Examples 2, 5 and 6, a foam insulated wire having a foam insulation with less occurrence of each variation and less generation of blowholes could be manufactured by providing appropriate conditions, such as gas pressure, etc., for viscosity of the material.

In Examples 6 to 8, resin compositions having lower viscosity within the range of the invention and different strain hardening rates from each other were used. Less variations and no generation of blowholes were observed in Examples 6 and 7, however, the outer diameter varied greatly in Example 8. Similarly to Example 4, this is caused by magnitude of difference in viscosity between the foaming starting point and the bubble growing period.

Comparative Examples 1 to 5 are results of trial products using resin compositions having higher viscosity than the range of the invention and different strain hardening rates from each other. In Comparative Example 1, it was possible to prevent generation of blowholes due to large strain hardening rate, however, the outer diameter and the foaming rate varied greatly. In Comparative Examples 2 and 3 with smaller strain hardening, the outer diameter variation exceeded the allowable value due to its originally high viscosity, and some generation of blowholes was also observed.

Comparative Examples 4 to 6 are for comparison of resin compositions having the same strain hardening rate and different viscosity from each other. Since the viscosity is high and the strain hardening rate is small in Comparative Examples 4 and 5, all of the outer diameter variation, the foaming rate variation and the generation of blowholes exceeded the allowable value. On the other hand, since the viscosity is adequate in Comparative Example 6, the variations are relatively small. However, the generation of blowholes is large.

Comparative Examples 7 and 8 are examples using resin compositions having lower viscosity than the range of the invention. The generation of blowholes and the foaming rate variation are in the satisfactory level, however, the outer diameter varied greatly due to uneven thickness which is probably caused by dripping during the foaming since the viscosity is too low.

The results shown above revealed that a foam insulated wire having a foam insulation with small variations in outer diameter and foaming rate as well as with less generation of blowholes can be manufactured by using the resin compositions of Examples 1 to 8 in Table 7, especially of Examples 2, 3 and 5 to 7.

In the following Tables 8 and 9 (Trial products 2 and 3), features of resin compositions in Examples and Comparative Examples are omitted.

Table 8 shows results of Trial product 2 (conductor diameter of 9.0 mm, outer diameter of foam insulation of 24 mm and foaming rate of 75%). It was possible to confirm the tendency similar to Table 7 (Trial product 1) as a whole.

TABLE 8

Results of Trial product 2 (conductor diameter: 9.0 mm, outer diameter of foam insulation: 24 mm, foaming rate: 75%)

| | Items | | Examples | | | | | | | | Comparative Examples | | | | | | | |
|---|---|---|---|---|---|---|---|---|---|---|---|---|---|---|---|---|---|---|
| | | | 1-2 | 2-2 | 3-2 | 4-2 | 5-2 | 6-2 | 7-2 | 8-2 | 1-2 | 2-2 | 3-2 | 4-2 | 5-2 | 6-2 | 7-2 | 8-2 |
| Conditions | Viscosity of resin composition | Pa·s | 2000 | 2000 | 1900 | 1900 | 1400 | 700 | 700 | 750 | 2500 | 2500 | 2500 | 2700 | 2500 | 1900 | 400 | 400 |
| | Strain hardening rate | % | 850 | 1100 | 1400 | 1800 | 1200 | 1100 | 1400 | 1800 | 1700 | 1000 | 800 | 550 | 550 | 550 | 1100 | 1700 |
| Evaluations | Gas pressure | MPa | 40 | 40 | 41 | 43 | 38 | 35 | 36 | 40 | 45 | 44 | 44 | 45 | 44 | 39 | 34 | 36 |
| | Outer diameter variation | | ◎ | ◎ | ◎ | ○ | ◎ | ◎ | ◎ | ○ | X | X | X | X | X | ○ | X | X |
| | Foaming rate variation | | ◎ | ◎ | ◎ | ○ | ◎ | ◎ | ◎ | ◎ | X | X | ○ | X | X | ○ | ○ | ○ |
| | Generation of blowholes | | ○ | ◎ | ◎ | ◎ | ◎ | ◎ | ◎ | ◎ | ◎ | ○ | ○ | X | X | X | ○ | ◎ |
| | Comprehensive evaluation | | ○ | ◎ | ◎ | ○ | ◎ | ◎ | ◎ | ○ | X | X | X | X | X | X | X | X |

Regarding Examples 1 to 4 in Table 8, Examples 2 and 3 are the most satisfactory products, generation of blowholes was slightly observed in Example 1, and some variations in outer diameter and foaming rate were observed in Example 4 with large strain hardening rate. Accordingly, it was possible to manufacture a foam insulated wire without practical problem.

Table 9 shows results of Trial product 3 (conductor diameter of 17.0 mm, outer diameter of foam insulation of 42 mm and foaming rate of 75%). It was possible to confirm the tendency similar to Table 7 (Trial product 1) as a whole.

TABLE 9

Results of Trial product 3 (conductor diameter: 17 mm, outer diameter of foam insulation: 42 mm, foaming rate: 75%)

| | Items | | Examples | | | | | | | | Comparative Examples | | | | | | | |
|---|---|---|---|---|---|---|---|---|---|---|---|---|---|---|---|---|---|---|
| | | | 1-3 | 2-3 | 3-3 | 4-3 | 5-3 | 6-3 | 7-3 | 8-3 | 1-3 | 2-3 | 3-3 | 4-3 | 5-3 | 6-3 | 7-3 | 8-3 |
| Conditions | Viscosity of resin composition | Pa·s | 2000 | 2000 | 1900 | 1900 | 1400 | 700 | 700 | 750 | 2500 | 2500 | 2500 | 2700 | 2500 | 1900 | 400 | 400 |
| | Strain hardening rate | % | 850 | 1100 | 1400 | 1800 | 1200 | 1100 | 1400 | 1800 | 1700 | 1000 | 800 | 550 | 550 | 550 | 1100 | 1700 |
| Evaluations | Gas pressure | MPa | 45 | 45 | 46 | 48 | 43 | 40 | 41 | 45 | 50 | 49 | 49 | 50 | 49 | 44 | 39 | 41 |
| | Outer diameter variation | | ○ | ○ | ○ | ○ | ◎ | ◎ | ○ | ○ | X | X | X | X | X | X | X | X |
| | Foaming rate variation | | ◎ | ◎ | ◎ | ○ | ◎ | ◎ | ◎ | ○ | X | X | ○ | X | X | ○ | X | X |
| | Generation of blowholes | | ○ | ○ | ◎ | ◎ | ◎ | ○ | ◎ | ◎ | ○ | ○ | X | X | X | X | ○ | ○ |
| | Comprehensive evaluation | | ○ | ◎ | ◎ | ○ | ◎ | ◎ | ◎ | ○ | X | X | X | X | X | X | X | X |

In Examples 2, 5, 6 and 7, a foam insulated wire with less occurrence of each variation and less generation of blowholes could be manufactured by providing appropriate conditions, such as gas pressure, etc., for viscosity of the resin composition.

The outer diameter varied greatly in Example 8. Similarly to Example 4, this is caused by magnitude of difference in viscosity between the foaming starting point and the bubble growing period.

It was possible to confirm the tendency of Comparative Examples which is similar to Table 7 (Trial product 1), where the outer diameter and the foaming rate varied greatly in Comparative Examples 1 to 5 using high viscosity resin compositions, and it was not possible to avoid generation of blowholes in Comparative Examples 4 to 6 with small strain hardening rate. In addition, in Comparative Examples 7 and 8 using low viscosity resin compositions, the outer diameter varied greatly due to uneven thickness which is probably caused by dripping.

Regarding Examples 1 to 4 in Table 9, Examples 2 and 3 are the most satisfactory products, generation of blowholes was slightly observed in Example 1, and some variations in outer diameter and foaming rate were observed in Example 4 with large strain hardening rate. Accordingly, it was possible to manufacture a foam insulated wire without practical problem.

In Examples 2, 5 and 6, a wire with less occurrence of each variation and less generation of blowholes could be manufactured by providing appropriate conditions, such as gas pressure, etc., for viscosity of the resin composition. Especially, all evaluations for Example 5 were satisfactory.

Less foaming rate variation and less generation of blowholes were observed in Examples 6 and 7, however, the outer diameter and the roaming rate were greatly varied in Example 8 even though there is no practical problem. Similarly to Example 4, this is caused by magnitude of difference in viscosity between the foaming starting point and the bubble growing period.

It was possible to confirm the tendency of Comparative Examples which is similar to Table 7 (Trial product 1), where the outer diameter and the foaming rate varied greatly in Comparative Examples 1 to 3 using high viscosity resin compositions, and it was not possible to avoid generation of blowholes in Comparative Examples 4 to 6 with small strain hardening rate. In addition, in Comparative Examples 7 and 8 using low viscosity resin compositions, the outer diameter varied greatly due to uneven thickness which is probably caused by dripping.

As shown in the above Tables 7 to 9, it was found that, in the foam insulated wire having a foam insulation formed by coating a conductor with the resin composition of the invention and foaming thereof, all of the outer diameter variation, the foaming rate variation and the generation of blowholes are smaller than the conventional art even though it is highly foamed. As a result, it is possible to effectively produce a high-performance foam insulated wire with low loss and small impedance variation.

Although the invention has been described with respect to the specific embodiment for complete and clear disclosure, the appended claims are not to be therefore limited but are to be construed as embodying all modifications and alternative constructions that may occur to one skilled in the art which fairly fall within the basic teaching herein set forth.

What is claimed is:

1. A resin composition, comprising:
a polyolefin resin,
wherein a viscosity of the resin composition is within a range of not less than 500 Pa·s and not more than 2300 Pa·s under measurement conditions of a measurement temperature of 170° C. and a measurement frequency of 1 Hz, and
wherein a strain hardening rate of the resin composition in uniaxial elongational viscosity measured under measurement conditions of a measurement temperature of 150° C. and a strain rate of 3.0 s$^{-1}$ is not less than 800%.

2. The resin composition according to claim 1, wherein the polyolefin resin comprises polyethylene or polypropylene, or a mixture thereof.

3. The resin composition according to claim 2, wherein the polypropylene included as a portion or an entirety of the resin composition comprises any one or a mixture of a homopolymer as a single polymer, a random copolymer and a block copolymer as a copolymer.

4. The resin composition according to claim 2, wherein the polyethylene included as a portion or an entirety of the resin composition comprises any one or a mixture of high-density polyethylene (HDPE), medium-density polyethylene (MDPE), low-density polyethylene (LDPE) and linear low-density polyethylene (LLDPE).

5. A foam insulated wire, comprising:
a conductor; and
a foam insulation extruded on an outer periphery of thereof,
wherein a diameter of the conductor is 3.5 to 18 mm, and an outer diameter of the foam insulation is not less than 8 mm,
wherein a viscosity of a resin composition forming the foam insulation is within a range of not less than 500 Pa·s and not more than 2300 Pa·s under measurement conditions of a measurement temperature of 170° C. and a measurement frequency of 1 Hz, and
wherein a strain hardening rate of the resin composition in uniaxial elongational viscosity measured under measurement conditions of a measurement temperature of 150° C. and a strain rate of 3.0 s$^{-1}$ is not less than 800%.

6. The foam insulated wire according to claim 5, wherein a polyolefin included in the foam insulation comprises polyethylene or polypropylene, or a mixture thereof.

7. The foam insulated wire according to claim 6, wherein the polypropylene included as a portion or an entirety of the foam insulation comprises any one or a mixture of a homopolymer as a single polymer, a random copolymer and a block copolymer as a copolymer.

8. The foam insulated wire according to claim 6, wherein the polyethylene included as a portion or an entirety of the foam insulation comprises any one or a mixture of high-density polyethylene (HDPE), medium-density polyethylene (MDPE), low-density polyethylene (LDPE) and linear low-density polyethylene (LLDPE).

* * * * *